United States Patent
McCully

(10) Patent No.: US 7,296,227 B2
(45) Date of Patent: Nov. 13, 2007

(54) DETERMINING LINE LEADING IN ACCORDANCE WITH TRADITIONAL JAPANESE PRACTICES

(75) Inventor: Nathaniel M. McCully, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 577 days.

(21) Appl. No.: 10/203,807

(22) PCT Filed: Feb. 12, 2001

(86) PCT No.: PCT/US01/04499

§ 371 (c)(1),
(2), (4) Date: Aug. 12, 2002

(87) PCT Pub. No.: WO01/59604

PCT Pub. Date: Aug. 16, 2001

(65) Prior Publication Data

US 2004/0205606 A1    Oct. 14, 2004

(51) Int. Cl.
*G06F 15/00* (2006.01)
*G06F 17/00* (2006.01)

(52) U.S. Cl. .................. 715/526; 715/527; 715/536; 715/542

(58) Field of Classification Search ........... 715/529, 715/526–527, 536, 542; 345/467; 101/403
See application file for complete search history.

(56) References Cited

U.S. PATENT DOCUMENTS

| | | | |
|---|---|---|---|
| 4,284,975 A | 8/1981 | Odaka | |
| 4,291,381 A | 9/1981 | Siebeck | |
| 4,591,999 A | 5/1986 | Logan | |
| 4,608,664 A | 8/1986 | Bartlett et al. | |
| 4,833,627 A | 5/1989 | Leszczynski | |
| 4,837,729 A * | 6/1989 | Funahashi | 345/685 |
| 4,906,114 A | 3/1990 | Tanaka et al. | |

(Continued)

FOREIGN PATENT DOCUMENTS

JP    61-282974    12/1986

(Continued)

OTHER PUBLICATIONS

"Leading", [http://web.archive.org/web/19970703182403/http://pbtweb.com/typostyl/leading.html], published on the Internet by Paul Baker Typography (hereinafter "PBT") and by Internet Archive on Jul. 3, 1997, p. 1.*

(Continued)

*Primary Examiner*—William Bashore
(74) *Attorney, Agent, or Firm*—Fish & Richardson P.C.

(57) ABSTRACT

Method and apparatus, including computer program products, implementing and using techniques for controlling leading. A region including a plurality of lines in data being typeset and displayed on a display device is specified. One of the lines in the plurality of lines is selected, and a user input is received to set a new leading value (S11, S12). The current leading value of the selected line is determined (S13). The difference between the new leading value and the current leading value is determined (S14). The spacing amount of the selected line based on the difference is adjusted. A desktop publishing system for controlling leading is also described.

18 Claims, 3 Drawing Sheets

U.S. PATENT DOCUMENTS

| | | | |
|---|---|---|---|
| 5,003,499 A * | 3/1991 | Fujiwara et al. ............ | 715/520 |
| 5,018,083 A | 5/1991 | Wantanabe et al. | |
| 5,175,806 A | 12/1992 | Muskovitz et al. | |
| 5,287,443 A | 2/1994 | Mameda et al. | |
| 5,353,222 A * | 10/1994 | Takise et al. ............... | 715/531 |
| 5,399,029 A | 3/1995 | Muraoka et al. | |
| 5,416,898 A | 5/1995 | Opstad et al. | |
| 5,432,890 A | 7/1995 | Watanabe | |
| 5,500,931 A | 3/1996 | Sonnenschein | |
| 5,501,538 A | 3/1996 | Sawada et al. | |
| 5,548,700 A | 8/1996 | Bagley et al. | |
| 5,579,471 A | 11/1996 | Barber et al. | |
| 5,581,670 A | 12/1996 | Bier et al. | |
| 5,617,115 A | 4/1997 | Itoh et al. | |
| 5,724,072 A | 3/1998 | Freeman et al. | |
| 5,724,596 A | 3/1998 | Lathrop | |
| 5,740,456 A | 4/1998 | Harel et al. | |
| 5,754,873 A * | 5/1998 | Nolan ....................... | 715/527 |
| 5,778,403 A | 7/1998 | Bangs | |
| 5,802,532 A | 9/1998 | Nakayama et al. | |
| 5,803,629 A | 9/1998 | Neville et al. | |
| 5,805,167 A | 9/1998 | Van Cruyningen | |
| 5,809,166 A | 9/1998 | Huang et al. | |
| 5,937,420 A | 8/1999 | Karow et al. | |
| 6,088,520 A | 7/2000 | Taoka et al. | |
| 6,321,243 B1 | 11/2001 | Ballard | |
| 6,330,577 B1 | 12/2001 | Kim | |
| 6,359,630 B1 | 3/2002 | Morse et al. | |
| 6,414,698 B1 * | 7/2002 | Lovell et al. ............... | 715/800 |
| 6,426,751 B1 | 7/2002 | Patel et al. | |
| 6,504,544 B1 | 1/2003 | Hollingsworth et al. | |
| 6,510,441 B1 | 1/2003 | Kenninga | |
| 6,624,814 B1 | 9/2003 | Karow et al. | |
| 6,882,441 B1 * | 4/2005 | Faust et al. ................ | 358/1.18 |
| 6,903,839 B1 * | 6/2005 | Laverty et al. ............ | 358/1.15 |
| 2001/0048764 A1 | 12/2001 | Betrisey et al. | |
| 2002/0062324 A1 | 5/2002 | McCully et al. | |
| 2002/0065852 A1 * | 5/2002 | Hendrickson et al. ...... | 707/517 |
| 2003/0063317 A1 | 4/2003 | McCully | |

FOREIGN PATENT DOCUMENTS

| | | |
|---|---|---|
| JP | 01-125656 | 5/1989 |
| JP | 1-271275 | 10/1989 |
| JP | 02-213983 | 8/1990 |
| JP | 04-052871 | 2/1992 |
| JP | 05-096806 | 4/1993 |
| JP | 05-224651 | 9/1993 |
| JP | 06-20026 | 1/1994 |
| JP | 06-96174 | 4/1994 |
| JP | 06-149806 | 5/1994 |
| JP | 07-096594 | 4/1995 |
| JP | 07-149005 | 6/1995 |
| JP | 07-182303 | 7/1995 |
| JP | 8-137871 | 5/1996 |
| JP | 8-161309 | 6/1996 |
| JP | 08-194832 | 7/1996 |
| JP | 08-314655 | 11/1996 |
| JP | 10-069477 | 3/1998 |
| JP | 10-222499 | 8/1998 |
| JP | 11-102446 | 4/1999 |
| JP | 11-353491 | 12/1999 |
| JP | 2000-267645 | 9/2000 |
| JP | 2001-281835 | 10/2001 |
| JP | 2001-297077 | 10/2001 |
| JP | 2003-523015 | 7/2003 |

OTHER PUBLICATIONS

U.S. Appl. No. 09/964,293, filed Sep. 25, 2001, Shade et al.

Hirschberg, D.S. et al., "New Applications of Failure Functions", *Journal of the Association for Computing Machinery*, vol. 34, No. 3, Jul. 1987, pp. 616-625.

Peter Karow, "Extending Control of Digital Typography", Visible Language, 32.2, Visible Language 1998, pp. 100-127 (671001 IDS Sep. 30, 2004).

* cited by examiner

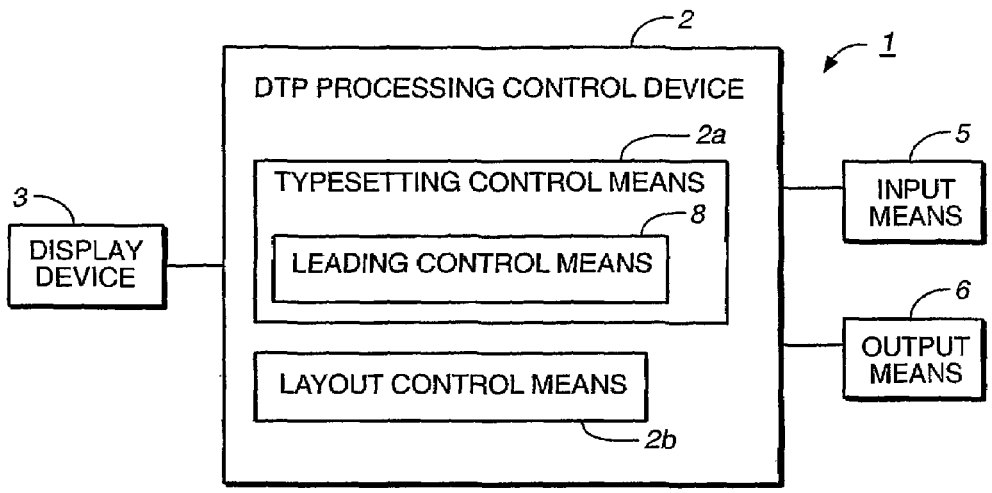
FIG._1
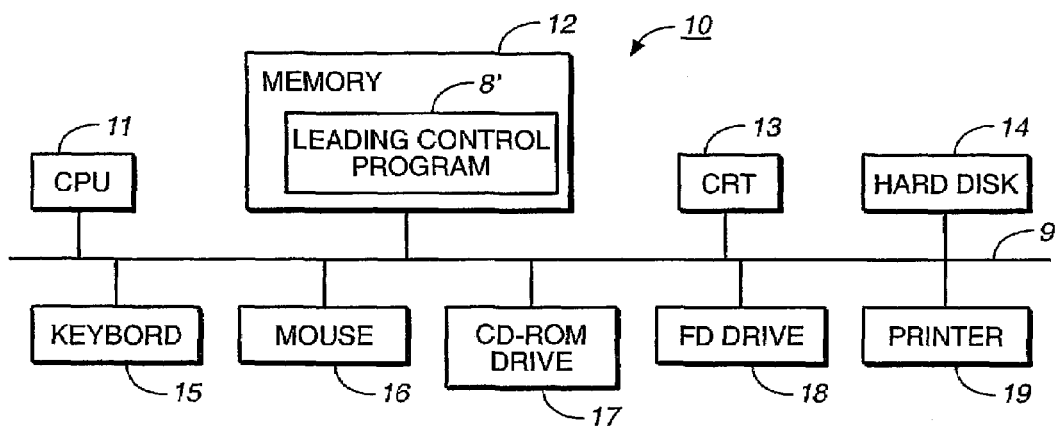
FIG._2
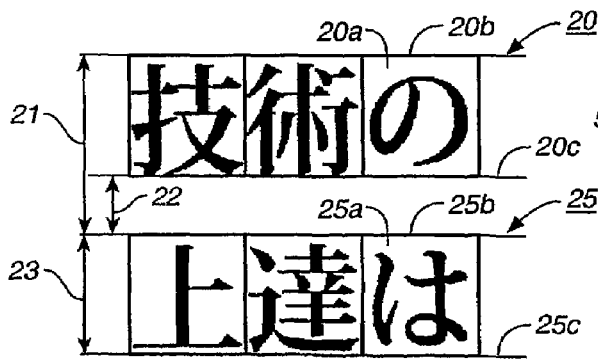
FIG._3
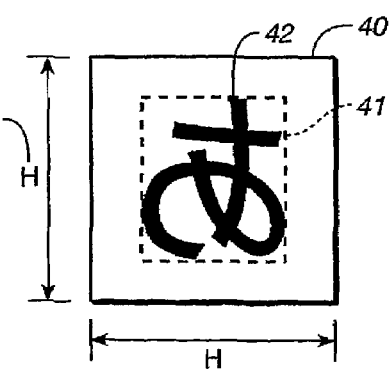
FIG._6

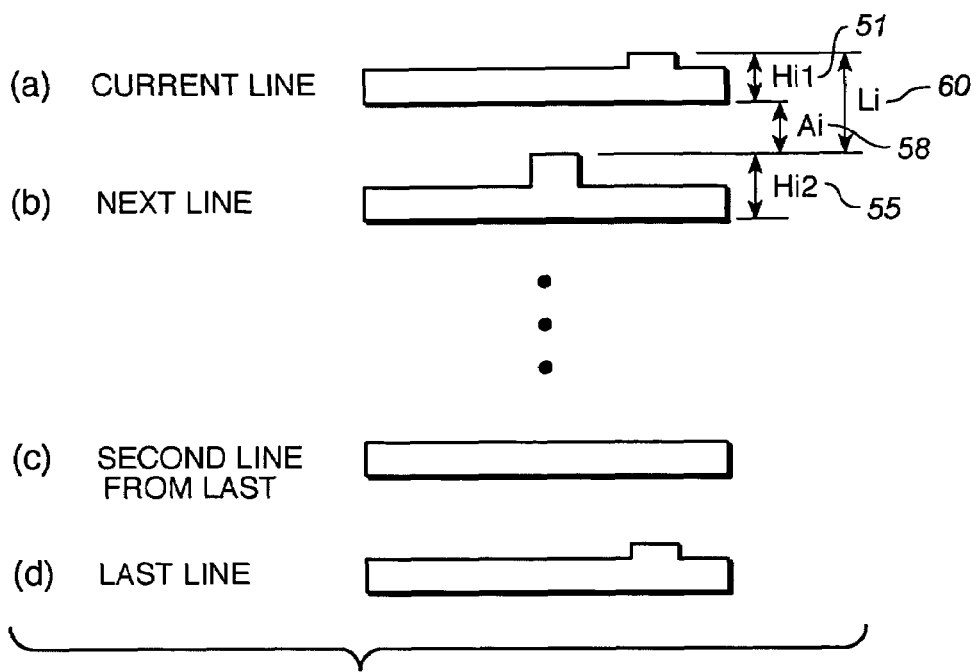
FIG._4
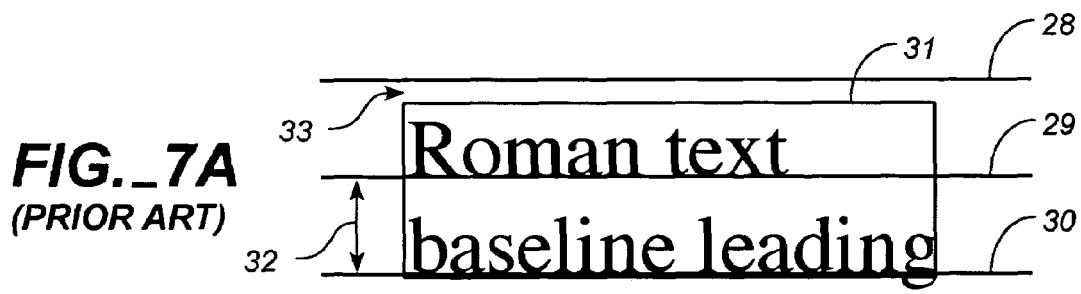
FIG._7A
(PRIOR ART)
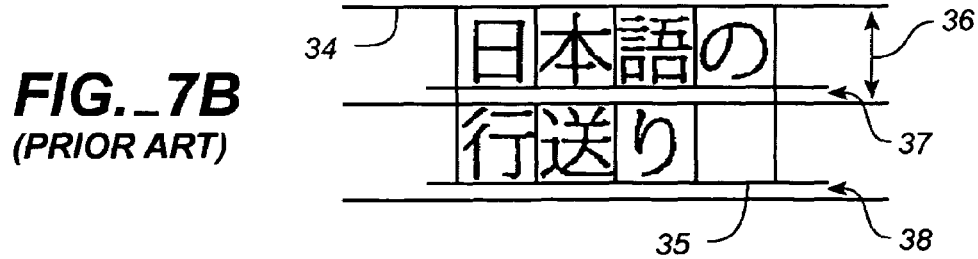
FIG._7B
(PRIOR ART)

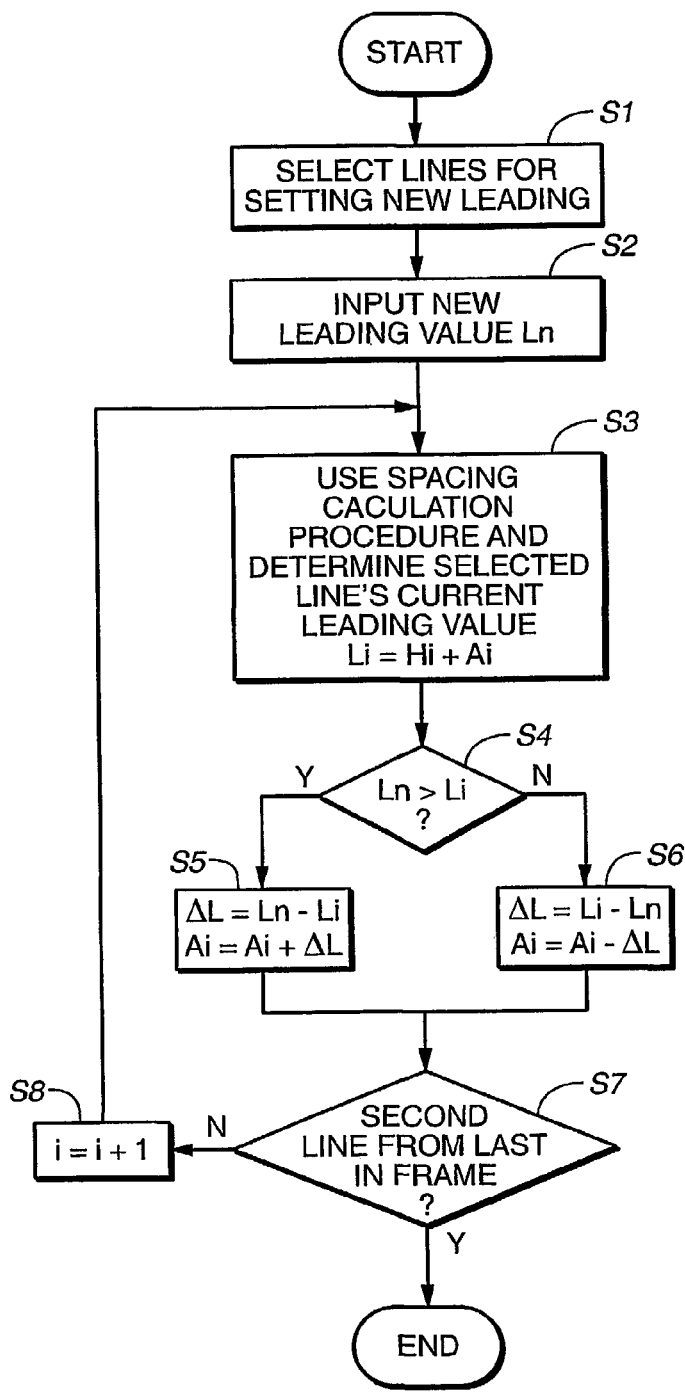
FIG._5A
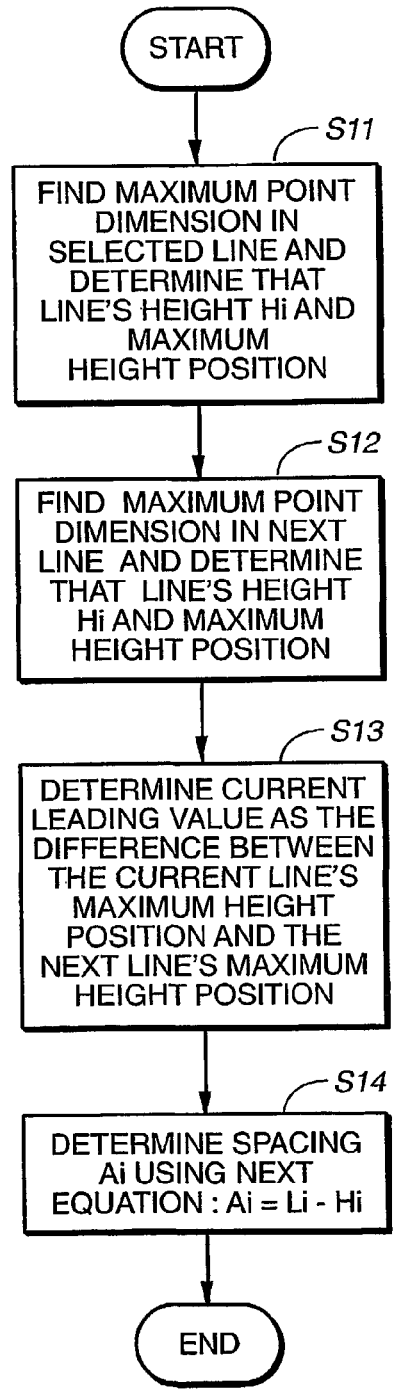
FIG._5B

DETERMINING LINE LEADING IN ACCORDANCE WITH TRADITIONAL JAPANESE PRACTICES

TECHNICAL FIELD

The invention relates to desktop publishing (DTP) technology, and more and more particularly to a typesetting technology for DTP.

BACKGROUND

In DTP using computers, data to be edited is displayed on a display device, and layout and typesetting operations (i.e., character typesetting) are performed on this data based on user input. In typesetting operations, "gyookuri" (leading in European-language typesetting), which is the relative positional relationship between a plurality of lines, is set. Leading is the distance between a line and the next line when the line is displayed or printed, and thus corresponds to the distance from one line's reference point to the next line's reference point. Therefore, leading includes one line's "line height" and the "spacing amount" (i.e., interline spacing) between that line and the next line.

However, there are situations in which the character data to be edited is not just Japanese but also a European language, and there are situations in which the two are mixed together. Therefore a DTP system needs to be capable of processing European languages as well as Japanese, and to handle documents containing a mixture of European languages and Japanese. When doing so, there are a number of points in which the typesetting rules for European language typesetting and Japanese typesetting differ, so automating DTP typesetting operations has proven to be difficult, and conventional DTP using computers must be processed by many manual user operations. Leading in typesetting operations is an example of a situation in which manual intervention by the user at present is unavoidable, thus making the typesetting operation difficult and complicated.

For example, in European language typesetting and conventional DTP, leading (i.e. "gyookuri" in Japanese) is set as a distance from a current line's baseline to a previous line's baseline. That is, as shown in FIG. 7A, in European-language typesetting two lines included in text frame 31 on the screen of a display device displaying data that is undergoing typesetting are coordinated and positioned on their respective baselines 29 and 30, and distance 32 between the first line's baseline and the next line's baseline corresponds to the leading. Therefore the top side of text frame 31, i.e. the top side of the first line, is offset downward by exactly gap 33 from reference line 28 set in the page.

On the other hand, FIG. 7B shows a case in which Japanese text is assigned inside text frame 35. As in FIG. 7A, this is a case in which the text is positioned according to the European-language baseline. Both examples are 24-point characters, and show a situation in which the result of automatic leading setting is leading (e.g. leading 32 and 36) set to a 29-point dimension. Both text frame 31 and 35 are coordinated on the European-language baseline. Nevertheless, the top side and the bottom side of the text frame 35 in FIG. 7B are vertically offset (e.g. gap 37 and 38) from the top side and bottom side of the text frame in FIG. 7A. In FIG. 7B, unlike the case in FIG. 7A, the top side of the text frame, i.e. the top side of the first line, is coordinated with reference line 34 set in the page.

In nearly all electronic typesetting today leading is set with reference to a baseline, so when the leading value of a current line is increased, for example, that line moves downward inside the text frame and is positioned more distantly from the previous line. Nevertheless, changing the current line's position by changing the leading value setting in this manner is not desirable, particularly in Japanese typesetting, so the user needs to manually correct the vertical position of one or more lines each time the set leading value changes.

SUMMARY

In general, in one aspect, the invention provides methods and apparatus, including computer program products, implementing and using techniques for controlling leading. A region including a plurality of lines of data being typeset and displayed on a display device is selected. One of the lines in the plurality of lines is selected, and a user input is received to set a new leading value. The current leading value of the selected line is determined. The difference between the new leading value and the current leading value is determined and the spacing amount of the selected line is adjusted based on the difference.

Implementations can include one or more of the following features. Lines below the selected line can be processed sequentially and continuously, subsequent to processing the selected line, until the next to last line in the plurality of lines. The leading value can be the distance between the maximum height position of one line and the maximum height position of the next line. The maximum height can be the maximum point dimension among the plurality of data point dimensions included in a line. The leading value can be the sum of the height and spacing amount for one line, the line height can be the maximum height of the line, and the spacing amount can be the distance between the bottom part of the line and the maximum height position of the next line.

In general, in another aspect, the invention provides a desktop publishing system implementing and using techniques for controlling leading. The desktop publishing system includes a desktop publishing processing control device that is provided with typesetting control means, a display device displaying data being typeset and input means for user input. The typesetting control means have a leading control means that is arranged to receive a user specification of a region including a plurality of lines in the data being typeset, select one of the lines in the plurality of lines and set a new leading value for the selected line. Furthermore, the leading control means is arranged to determine a consecutive line height and spacing amount for the selected line and the next line, determine a current leading value and adjust a current spacing amount based on the new leading value and the current leading value.

In general, in another aspect, the invention provides methods and apparatus, including computer program products, implementing and using techniques for controlling leading. A user specification of a region including a plurality of lines in the data being typeset is received. One of the lines in the plurality of lines is selected. A new leading value for the selected line is set. A consecutive line height and spacing amount for the selected line and the next line is determined. A current leading value is determined and a current spacing amount is adjusted based on the new leading value and the current leading value.

Potential advantages of the invention may include one or more of the following. The aforesaid defects of prior art may be eliminated in and leading control in electronic typesetting may be improved. A leading control technology for electronic typesetting can be provided that may make it possible to automatically change all leading without requiring manual adjustment by the user. A DTP system may be provided that can appropriately and swiftly set and change leading for text comprising English or Japanese or a mixture thereof. An improved leading control method for electronic typesetting and a recording medium storing a leading control program may be provided.

The details of one or more implementations of the invention are set forth in the accompanying drawings and the description below. Other features, objects, and advantages of the invention will be apparent from the description and drawings, and from the claims.

DESCRIPTION OF DRAWINGS

FIG. 1 is a schematic block diagram showing a DTP system capable of controlling leading in accordance with one implementation of the invention.

FIG. 2 is a schematic block diagram showing a DTP system capable of controlling leading in accordance with another implementation of the invention.

FIG. 3 is a schematic diagram explaining various parameters that are used when setting leading in the invention.

FIGS. 4A-4D are schematic diagrams showing a plurality of lines, to be set with new leading, arranged in a text frame displayed on the screen of a display device.

FIGS. 5A and 5B are flowcharts showing the leading control sequence in electronic typesetting in accordance with one implementation of the invention.

FIG. 6 is a schematic diagram showing embox 30 that is used when controlling leading in one implementation of the invention.

FIGS. 7A and 7B are schematic diagrams comparing the differences in European language and Japanese when leading is set automatically in conventional electronic typesetting.

Like reference symbols in the various drawings indicate like elements.

DETAILED DESCRIPTION

FIG. 1 shows an electronic DTP processing system 1 in accordance with one implementation of the invention. DTP processing system 1 shown in FIG. 1 has a DTP processing control device 2, which can perform electronic typesetting and layout editing and so forth; a display device 3 for displaying the data being processed; an input means 5 for inputting various types of data such as graphics, text, control instructions, etc.; and an output means 6 for outputting processed data. DTP processing control device 2 has typesetting control means 2a, which controls typesetting, and layout control means 2b, which controls layout editing. Typesetting control means 2a has leading control means 8, which automatically sets and changes leading for a plurality of lines in a region specified in the data being typeset in electronic typesetting.

Display device 3 can comprise various types of display devices such as a CRT or LCD, etc. Input means 5 can include a keyboard, pointing device (mouse, track ball, track point, etc.), scanner, communication interface, etc. In addition, output means 6 can comprise a printer, external memory device, etc. DTP processing control device 2 can consist of a processor such as a CPU, etc., or a memory, or an electronic typesetting processing program, etc. that includes a leading control routine that is loaded into memory and processed by a processor. On the other hand, DTP processing control device 2 can also be constituted in part or in whole as hardware or firmware.

FIG. 2 is a block diagram showing a DTP system 10 provided with the leading processing function in accordance with the invention, constituted by applying the invention to a general-purpose computer system. That is, system 10 shown in FIG. 2 has a CPU 11, a memory 12, a CRT 13, a hard disk 14, a keyboard 15, a mouse 16, a CD-ROM drive 17, a FD drive 18, and a printer 19. These units are connected and work together via a bus 9. In electronic typesetting in accordance with the invention, a leading control program 8 is installed in system 10 via CD-ROM drive 17 or FD drive 18, and stored on hard disk 14, for example. Then, when this leading control program 8 or an electronic typesetting program containing the leading control program are started by a user operating keyboard 15 or mouse 16, the leading control program is loaded into memory 12 as shown in the diagram. Therefore the leading control means is constituted as CPU 11 and layout editing program 8 loaded into memory 12. Therefore, in accordance with one aspect of the invention a computer-readable recording medium (for example, CD-ROM, FD, tape, semiconductor memory, etc.) storing a leading control program is provided so that a general-purpose computer system can be converted into a DTP system providing the leading control function in accordance with the invention.

FIG. 3 shows two lines to be set with the desired leading value in accordance with the invention. The lines constitute part of data being electronically typeset that is displayed on the screen of display device 3. Each line 20 is displayed on the page of an electronic document displayed on the screen. Each line 20 has a plurality of cells 20a, with each cell 20a containing one character. Each line 20 has a top part (top side) 20b and a bottom part (bottom side) 20c, and the distance 23 in the vertical direction between the top part 20b and the bottom part 20c is the height of the line. The vertical distance 21 between the first line's top part 20b and the second line's top part is the leading value for these lines. In addition, vertical distance 22 between the first line's bottom part 20c and the second line's top part is the spacing (interline spacing) amount. Therefore leading value 21 is defined as the sum of line height 23 and spacing amount 22. Furthermore, one feature of the invention is that line height 23 and spacing amount 22 are handled as two different quantities.

Furthermore, it should be noted that each line does not always contain characters having the same font or dimensions; there are instances in which different fonts, particularly fonts including characters with different dimensions, are included in a line. In such a situation the invention determines the top part 20b and the bottom part 20c of a line according to the maximum height position and the minimum height position of the line, respectively. In this case one implementation of the invention uses the "embox" concept to regulate character arrangement within each line. As shown in FIG. 6, an embox is frame 40 surrounding glyph 42 (the character "a" in this case), and corresponds to a so-called "imaginary body." Embox 40 is square in shape and the length of one side of the embox corresponds to the character's point dimension H. Furthermore, FIG. 6 shows bounding box (surrounding box) 41 surrounding glyph 42. The bounding box is defined by a pair of parallel horizontal lines and a pair of parallel vertical lines that touch the outermost points of glyph 42 in the vertical and horizontal directions. Bounding box 41 corresponds to the so-called "character face." The height of embox 40 is the point dimension, and the point dimension is one of the attributes of glyph 42, so the height of a line can be determined by checking the point dimensions of all of the characters to be included in the line. Also, in one implementation of the invention, the plurality of characters included within a line is arranged by aligning the bottom sides of the characters' emboxes 40 so in this case the embox 40 of the character with the largest point dimension within the line projects upward compared to the others.

Next, the leading control function in accordance with one implementation of the invention will be explained with reference to FIGS. 4 and 5.

FIG. 4 schematically shows (a) through (d), which are within a plurality of lines displayed within rectangular text frames on the page of an electronic document that is undergoing electronic typesetting and is displayed on the screen of display device 3 (CRT 13). Furthermore, a text frame can be created as a rectangular region by the user selecting a text tool for text input from a tool box (not shown in drawings) displayed on the screen, for example, and moving the cursor on the screen and determining the position of the cursor. Text can then be arranged within this text frame by typing and inputting the text directly into the text frame or by flowing the text in from another file. In addition, part of text already present on the electronic page can be selected and inserted into the text frame. Values such as line length and leading within the text frame are set as defaults or by user settings. Therefore, when character data is input into a text frame, characters are arranged in each line and the separation between lines is set according to the set leading value as shown in FIG. 4 for the respective lines.

However, as described previously, each line does not always contain characters that all have the same size (point dimension), and in this implementation the characters in each line are arranged with all of their embox bottom parts (bottom sides) aligned on a reference line (for example, a horizontal line on a grid in the text frame), so for large characters have large emboxes, the emboxes project upwards compared to the other emboxes for small characters. Therefore, in current line (a) in FIG. 4 the largest character is arranged near the end of the line, and the embox for that character projects upward compared to the emboxes for the other characters, and the embox determines the line height Hi, and thus the maximum height position for that line. In addition, in the next line (b) the largest character is positioned near the center of the line, and the embox for this character projects upward compared to the emboxes of the other characters, and the dimensions of this embox regulates line height Hi, and thus the maximum height position of that line. The spacing (i.e. interline spacing) Ai is determined between the position of the bottom part of current line (a) and the maximum height position of the next line (b). The distance between the maximum height position of current line (a) and the maximum height position of next line (b) is leading Li. As shown in FIG. 4, the largest character in last line (d) is positioned near the end of that line, but in second line from last (c) all of the characters in the line are the same size.

Next, an example of setting leading according to an electronic typesetting leading control procedure in accordance with an implementation of the invention will be explained with reference to FIGS. 5A and 5B. First, assume that the user operates input means 5, which is mouse 16, keyboard 15 or the like, and uses mouse 16 or keyboard 15 to select (step S1) current line (a) (this does not always have to be the first line in a text frame) shown in FIG. 4, among a plurality of lines displayed in a text frame, and sets a new leading value for the plurality of lines from current line (a) through last line (d) (step S2). When this happens, the leading control means executes the "spacing calculation procedure" (step S3) shown in FIG. 5B and determines leading value Li set for the selected current line (a).

That is, as shown in the process in FIG. 5B, the leading control means finds the maximum size—for example, the maximum point dimension—within selected current line (a), and determines the line's height Hi and the position for the maximum height of the line (step S11). Next, the process finds the maximum size—for example, the maximum point dimension—within the next line (b), and determines the height Hi+1 of that line and the position of the maximum height for that line (step S12). The process then determines the leading value Li set for current line (a) as the difference between the maximum height position of current line (a) and the maximum height position of next line (b) determined in this manner (step S13). Next, the process calculates spacing amount Ai for current line (a) using the formula Ai=Li-Hi, from thus determined leading value Li and previously determined line height Hi (step S14). Furthermore, if the process knows that the same leading value was set for all of the lines, or if the leading value set for each line can be input, a subroutine can be added to step S11 to branch to step S14 after determining the line height Hi of the current line (a).

When the spacing amount Ai for the current line is determined as described above, next, the leading value Li set for current line (a) and the new leading value Ln are compared (step S4), and if the new leading value Ln is larger, the difference ΔL between the new leading value Ln and the leading value Li is added to the spacing amount Ai for the current line (step S5), while if the new leading value Ln is smaller, the difference ΔL between the leading value Li and the new leading value Ln is subtracted from the current spacing amount Ai for the current line (step S6), and as a result, a new leading value Ln is set for current line (a).

Next, the processing is executed sequentially for the line following line (b), and processing is continuously executed until line (c), the second line from (d), the last line in the frame. In this case, when the preset leading value for all of the lines is already known, or when it is already known that all of the lines have the same leading value, only the height Hi for each line is determined, and a branch routine to adjust the spacing amount for each line by adding or subtracting Hi and the already known leading value can be provided.

Therefore, the leading control mechanism in accordance with the invention described above can set a new leading value and move only the lines following the selected line without moving the selected current line. Leading can therefore be automatically set in electronic typesetting, which conventionally is done manually for Japanese, and the efficiency of typesetting operations can be increased. In addition, the position of the selected current line does not change regardless of whether the leading value for the line is increased or decreased.

In addition, in another implementation of the invention the spacing amount Ai obtained at the top can be arranged for each line calculated as described above or for appropriately selected lines. In this case, the current line moves upward or downward according to the size of spacing amount Ai, which makes it possible to provide a function that is the same as leading control referenced upon a baseline in European-language typesetting.

A number of implementations of the invention have been described. Nevertheless, it will be understood that various modifications may be made without departing from the spirit and scope of the invention. Accordingly, other implementations are within the scope of the following claims.

What is claimed is:

1. A computer-implemented method for controlling leading, composing:
    specifying a region including a plurality of lines of data being typeset and displayed on a display device, selecting one of the lines in the plurality of lines, and receiving user input to set a new leading value for the selected line;
    determining a current leading value of the selected line, where the current leading value is equal to the sum of a height of the selected line and a spacing amount between the selected line and a next line;
    determining the difference between the new leading value and the current leading value; and
    adjusting the spacing amount between the selected line and the next line based on the difference so that the sum of the height of the selected line and the adjusted spacing amount is equal to the new leading value set by the user.

2. The method of claim 1, further comprising processing sequentially and continuously lines below the selected line subsequent to processing the selected line until the next to last line in the plurality of lines.

3. The method of claim 1, wherein the leading value is the distance between the maximum height position of the selected line and the maximum height position of the next line.

4. The method of claim 3, wherein the maximum height is the maximum point dimension among the plurality of data point dimensions included in that line.

5. The method of claim 1, wherein the leading value is the sum of the line height and spacing amount for one line, the line height is the maximum height of the line, and the spacing amount is the distance between the bottom part of the line and the maximum height position of the next line.

6. A computer program product, stored on a machine-readable medium, comprising instructions operable to cause a programmable processor to:
    specify a region including a plurality of lines of data being typeset and displayed on a display device, select one of the lines in the plurality of lines, and receive user input to set a new leading value for the selected line;
    determine a current leading value of the selected line, where the current leading value is equal to the sum of a height of the selected line and a spacing amount between the selected line and a next line;
    determine the difference between the new leading value and the current leading value; and
    adjust the spacing amount between the selected line and the next line based on the difference so that the sum of the height of the selected line and the adjusted spacing amount is equal to the new leading value set by the user.

7. The product of claim 6, further comprising instructions operable to cause a programmable processor to process sequentially and continuously lines below the selected line subsequent to processing the selected line until the next to last line in the plurality of lines.

8. The product of claim 6, wherein the leading value is the distance between the maximum height position of the selected line and the maximum height position of the next line.

9. The product of claim 8, wherein the maximum height is the maximum point dimension among the plurality of data point dimensions included in that line.

10. The product of claim 6, wherein the leading value is the sum of the height and spacing amount for one line, the line height is the maximum height of the line, and the spacing amount is the distance between the bottom part of the line and the maximum height position of the next line.

11. A desktop publishing system for controlling leading, comprising:
    a desktop publishing processing control device provided with typesetting control means;
    a display device displaying data being typeset; and
    input means for user input;
where the typesetting control means includes a leading control means that is arranged to:
    receive a user specification of a region including a plurality of lines in the data being typeset, selecting one of the lines in the plurality of lines, and setting a new leading value for the selected line;
    determine a line height for the selected line and a current spacing amount between the selected line and the next line;
    determine a current leading value, where the current leading value is equal to the sum of the determined line height and spacing amount; and
    adjusting the current spacing amount between the selected line and the next line based on the new leading value and the current leading value so that the sum of the line height of the selected line and an adjusted current spacing amount is equal to the new leading value.

12. A method for controlling leading, comprising:
    receiving a user specification of a region including a plurality of lines in the data being typeset;
    selecting one of the lines in the plurality of lines;
    setting a new leading value for the selected line;
    determining a line height for the selected line and a current spacing amount between the selected line and the next line;
    determining a current leading value, where the current leading value is equal to the sum of the determined line height and spacing amount; and
    adjusting the current spacing amount between the selected line and the next line based on the new leading value and the current leading value so that the sum of the line height of the selected line and an adjusted current spacing amount is equal to the new leading value.

13. A computer program product, stored on a machine-readable medium, comprising instructions operable to cause a programmable processor to:
    receive a user specification of a region including a plurality of lines in the data being typeset;
    select one of the lines in the plurality of lines;
    set a new leading value for the selected line;
    determine a line height for the selected line and a current spacing amount between the selected line and the next line;
    determine a current leading value, where the current leading value is equal to the sum of the determined line height and spacing amount; and
    adjust the current spacing amount between the selected line and the next line based on the new leading value and the current leading value so that the sum of the line height of the selected line and an adjusted current spacing amount is equal to the new leading value.

14. A system comprising:
    a user input device, a display, a memory device, and a processor programmed to:
        specify a region including a plurality of lines of data being typeset and displayed on a display device, selecting one of the lines in the plurality of lines, and receiving user input to set a new leading value for the selected line;

determine a current leading value of the selected line, where the current leading value is equal to the sum of a height of the selected line and a spacing amount between the selected line and a next line;

determine the difference between the new leading value and the current leading value; and adjust the spacing amount between the selected line and the next line based on the difference so that the sum of the height of the selected line and the adjusted spacing amount is equal to the new leading value set by the user.

15. The system of claim 14, where the processor is further programmed to:

process sequentially and continuously lines below the selected line subsequent to processing the selected line until the next to last line in the plurality of lines.

16. The system of claim 14, wherein the leading value is the distance between the maximum height position of the selected line and the maximum height position of the next line.

17. The system of claim 16, wherein the maximum height is the maximum point dimension among the plurality of data point dimensions included in that line.

18. The system of claim 14, wherein the leading value is the sum of the line height and spacing amount for one line, the line height is the maximum height of the line, and the spacing amount is the distance between the bottom part of the line and the maximum height position of the next line.

* * * * *